US008245926B2

(12) United States Patent
Guess et al.

(10) Patent No.: US 8,245,926 B2
(45) Date of Patent: Aug. 21, 2012

(54) METHOD OF PREVENTING MULTIPLE READS WHEN SCANNING GROUPS OF OPTICAL CODES

(75) Inventors: Alan J. Guess, Veneta, OR (US); WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 378 days.

(21) Appl. No.: 12/610,163

(22) Filed: Oct. 30, 2009

(65) Prior Publication Data

US 2010/0123005 A1    May 20, 2010

Related U.S. Application Data

(60) Provisional application No. 61/116,126, filed on Nov. 19, 2008.

(51) Int. Cl.
*G06K 7/10* (2006.01)
*G06K 15/00* (2006.01)
(52) U.S. Cl. .................................. 235/383; 235/472.01
(58) Field of Classification Search .................. 235/383, 235/472.01–472.03, 462.01–462.45
See application file for complete search history.

(56) References Cited

U.S. PATENT DOCUMENTS

| | | | |
|---|---|---|---|
| 5,365,048 A | 11/1994 | Komiya et al. | |
| 5,408,080 A | 4/1995 | Zazzu et al. | |
| 5,493,108 A | 2/1996 | Cherry et al. | |
| 6,206,286 B1 | 3/2001 | Watanabe et al. | |
| 6,343,742 B2 | 2/2002 | Watanabe et al. | |
| 6,357,659 B1 | 3/2002 | Kelly et al. | |
| 6,454,168 B1 * | 9/2002 | Brandt et al. ............ 235/462.12 |
| 6,527,179 B1 | 3/2003 | Itoh et al. | |
| 6,561,427 B2 * | 5/2003 | Davis et al. ............... 235/462.07 |
| 6,698,658 B2 | 3/2004 | McQueen | |
| 6,932,273 B2 | 8/2005 | McQueen | |
| 2002/0148899 A1 * | 10/2002 | Brandt et al. ............ 235/462.12 |
| 2006/0032919 A1 | 2/2006 | Shearin | |
| 2007/0267584 A1 | 11/2007 | Cherry | |
| 2008/0029604 A1 | 2/2008 | Blanford | |
| 2009/0084854 A1 * | 4/2009 | Carlson et al. ........... 235/462.41 |
| 2010/0001075 A1 * | 1/2010 | Barkan ..................... 235/462.41 |
| 2010/0123005 A1 * | 5/2010 | Guess et al. .................... 235/383 |

FOREIGN PATENT DOCUMENTS

| | | | |
|---|---|---|---|
| JP | 58221468 A | 12/1983 |
| JP | 04147396 A | 5/1992 |
| JP | 04297969 A | 10/1992 |

OTHER PUBLICATIONS

*Cyclic Redundancy Check* Wikipedia http://en.wikipedia.org/wiki/Cylic_redundancy_check (visited Sep. 30, 2008).

* cited by examiner

*Primary Examiner* — Thien M Le
(74) *Attorney, Agent, or Firm* — Stoel Rives LLP

(57) ABSTRACT

State-of-the-art optical scanning systems feature digital imaging of multiple symbolic labels such as optical bar codes. An imaging scanner reads a label 10 to 100 times faster than a conventional laser scanner because a group of items may be placed in the read zone simultaneously, or an item may bear multiple labels, thus allowing multiple symbolic labels to be captured in a single image. A preferred system/method is directed to a software-implemented "multiple label double read" protection scheme for preventing duplication errors in an advanced bar code reader using multiple fixed delay timers, with each timer being somewhat analogous to existing "single label double read" schemes. Determining the presence of duplicate data is accomplished by comparing label data or portions of label data to a set of recent buffered data representing the last N labels read and transmitted within a specified delay time.

20 Claims, 4 Drawing Sheets

METHOD OF PREVENTING MULTIPLE READS WHEN SCANNING GROUPS OF OPTICAL CODES

RELATED APPLICATION DATA

This application claims priority to U.S. provisional application No. 61/116,126 filed Nov. 19, 2008, hereby incorporated by reference.

COPYRIGHT NOTICE

©2008, 2009 Datalogic Scanning, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

BACKGROUND

The field of the present disclosure relates to systems and methods for optical bar code scanning and decoding technology, implemented in software. Labels bearing identification, pricing, product, or inventory information in an optical code format are commonly affixed to items for use in applications such as retail (sales inventory, pricing, checkout) and manufacturing (product movement through manufacturing lines and warehouses, capital inventory). Symbolic labels encode in a variety of formats information that uniquely identifies the item. An example of a symbolic label is an optical bar code label, comprising a series of parallel dark bars of varying widths with intervening light spaces, also of varying widths. Alpha-numeric characters are encoded in the labels by the specific sequence of bars and spaces with groupings of bars and spaces representing the character information. In addition to data characters, many labels utilize feature characters, such as center or guard characters, which are used as delimiters to separate segments of a label.

The precise nature of the representation depends on the particular bar code symbology in use. A common symbology is the Universal Product Code (UPC) label in which each character is made up of two bars and two interleaved spaces. The width of each character is measured in units called "modules" with each character being seven modules wide. The width of any particular bar or space within the character representation is between one and four modules. The character value depends on the relative width in modules of the two bars and two spaces it comprises. For example, indicating bars with a 1 and spaces with a 0, a sequence of 111 would represent a bar that is three modules wide. The character value 5 may be represented as 0110001, i.e., a one-module wide space, a two-module bar, a three-module space, and a one-module bar, respectively.

There are many variations of the UPC label symbology: UPC-A, UPC-E, etc. In addition to UPC formats, there exist other label formats that vary according to structure, content, parity requirements, and types of feature characters, among other attributes. Code 39 and Code 128, for example, are categorized as non-segmented label formats, i.e., they have no center feature characters separating two or more segments of bars. Many new label encoding schemes have been developed which have differing pattern structures for the dark and light areas. Examples of these recent code types are stacked bar code formats such as Code 49, PDF 417, and 2D/matrix codes such as Maxicode and Data Matrix code.

Optical scanning systems use various devices and methods for the purpose of sensing symbolic labels, identifying the particular label format, decoding the data stored in the label, and transmitting it electronically to a host computer such as a remote centralized tracking system, or a local point-of-sale (POS) terminal. Common types of bar code readers include spot scanners and line scanners, which may be fixed or hand-held. When using a fixed scanner, items are passed, either manually or automatically, through a designated spatial "read volume" to intercept a laser beam. When using a hand-held scanner, a human operator manually aims the laser beam at the bar code and pulls a trigger to activate a "read." The path along which the illuminating laser beam is directed is typically referred to as a "scan line." A photodetector monitors the light reflected or back-scattered from the bar code pattern sensed along each scan line. The photodetector may generate a current that is proportional to the intensity of the reflected light, so that a high current indicates a space and a low current indicates a bar. A collection subsystem converts optical information gathered by the photodetector into an electronic signal that may be recognized by a computer or other electronic system.

Recovering information from optical bar code labels poses many difficulties that must be overcome by the scanning system. For example, there may be many scans executed along different or repeated scan lines for each successful "read" that is reported to the host computer. To read a complete label in a single optical pass, the label must be properly oriented with respect to the scanning beam. Early scanners depended upon individual scan lines extending across the entire bar code for it to be successfully captured. Failure to read in a single pass used to require the item to be re-positioned and re-scanned until a successful read was obtained. These systems presented difficulties and inefficiencies in real-time, practical applications in which the orientation of the bar code with respect to the scanner is difficult to control.

Even if a label is not captured completely in a single scan, multiple scans of the label generated from an omnidirectional scanning system typically provide some partial label information in each of multiple scan lines. Present systems incorporate specialized piecing mechanisms, comprising software or electronics, that have been developed and are capable of sensing portions of bar codes and "stitching" them into a complete code. Details regarding exemplary stitching methods and systems may be found in U.S. Pat. No. 5,493,108, entitled "Method and Apparatus for Recognizing and Assembling Optical Code Labels" and hereby incorporated by reference. When a complete code is obtained, the scanner emits a characteristic audible tone (e.g., "beep"), indicating a successful read of the bar code data, which is then reported to a host computer.

Detection of identical bar code data in two or more sequential reads may indicate intentional presentation of multiples of a similar item, or it may indicate a double-read error (i.e., erroneous duplicate) of the same item. For example, if a scanner operator hesitates while scanning an item, the scanned bar code may accidentally register twice. In the case of a double-read error, sequential detections occur in rapid succession. Some retail checkout scanners therefore include a fixed delay timer, in communication with the system processor, that prevents multiple reporting of the bar code data to the host computer. One such fixed delay timer system is included in the QuickScan® scanner, available from Datalogic Scanning, Inc. of Eugene, Oreg. An alternate double read prevention scheme entails a comparison of spatial coordinates of the corners of bar code symbols read in succession, rather than decoded alphanumeric characters represented by the bar codes themselves, such as disclosed in U.S. Pat. No. 5,365, 048.

A duplicate reporting prevention scheme employing a fixed-delay programmable timer is activated each time a scanner correctly reads and decodes a bar code label on an item. Upon activation, the timer is initialized to a designated fixed delay time, typically in the range of about 0.1-1 second, and begins decrementing to zero. A set of decoded label data corresponding to the bar code label is retained in a memory cell as long as the timer is active. When the timer expires, the memory cell is cleared. If the timer expires before an identical bar code is encountered at the scanner, the next bar code read is assumed to represent a distinctly separate merchandise item, and a second set of data is intentionally reported to the host computer. If an identical bar code is read within the "double read timeout" (DRT) period before the timer expires, the identical data is determined to be duplicative, and it is therefore discarded and not reported to the host computer a second time. Use of a fixed delay timer thus provides "single label double read" protection. It is noted that, in the above examples, double read protection is based on the single set of bar code data that directly precedes a particular read event.

The above logic is diagrammed in a flowchart shown in FIG. 1, which illustrates a software implementation of a decision sequence for an existing single label double read protection scheme. With reference to FIG. 1, an item is first placed within the read zone of an optical scanner in process block 110. The scanner proceeds in process block 115 to read and decode a bar code label affixed to the item, thereby producing decoded label data. Next, decision block 120 determines whether a countdown timer is running, by checking the timer to see whether the designated delay time for the previous read event has expired. If the timer is active (i.e., still decrementing, or not expired) then the new decoded label data is checked at decision block 123, to determine whether the label just read matches the saved data by comparing the label just read against the stored data from the previous read event. If the data matches, the decoded label data is considered duplicative and is therefore discarded, and the countdown timer is restarted. If there is no match, the decoded label data is determined to be legitimate. Proceeding to process block 125, the data is saved in the first empty memory slot and the countdown timer is restarted. The decoded label data is then reported, via process block 130, by sending the label data to a host computer, or POS terminal 132.

The present inventors have recognized that the prior systems have limitations In versatility and thus can be improved upon.

SUMMARY

State-of-the-art opto-electronic scanning systems feature simultaneous digital imaging of multiple labels. Instead of requiring a cashier to pass items sequentially (that is, one at a time) through a scanner read zone to intercept a laser beam, a group of items may be placed together in the read zone so that multiple bar codes may be captured in a single image. In another application, one item may exhibit a plurality of labels, some of which bear redundant information, while others contain unique information. The present inventors have thus recognized that an imaging scanner may capture more than one label at once and stream label information to a decoding engine within the scanning system, or an operator may scan individual bar codes in rapid succession, thereby entering a group of labels into the system. Whereas a conventional laser beam scan incurs a gap of 10-100 milliseconds between reading successive labels, an imaging scanner reads a label every 100-1000 microseconds, or 10-100 times faster than the laser scanner.

Disclosed herein is "multiple label double read" protection scheme that prevents/inhibits duplication errors when scanning groups of labels together, the preferred multiple label double read scheme using multiple fixed delay timers, implemented in software. A preferred method of reading comprises determining the presence of duplicate data by comparing label data or portions of label data and associated attributes to a set of buffered data representing the last N labels read and transmitted. Thus, instead of simply performing a 1:1 comparison of the bar code data corresponding to the current label with the bar code corresponding to the label immediately preceding it, a 1:N comparison is made, comparing each bar code in the group with data retained in a comprehensive buffer describing as many as N previous items.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments will now be described with reference to the drawings. A preferred embodiment is directed to systems and methods for preventing multiple reads of items being presented at a retail check-out station where groups of items are scanned, and corresponding label data is reported to a host computer. In a preferred embodiment, the host computer is a POS terminal, and the optical code is a bar code. For convenience the methods and systems may be described herein with reference to bar codes, however, it is understood that the methods described herein are applicable to any host computer and to any type of optical code. A preferred method of "multiple label double read" protection may be used in conjunction with any type of symbolic label scanner, including handheld, fixed, or imaging type scanners. A preferred system employs an imaging scanner, such as the Magellan® 1000i, 1100i or 1400i scanners available from Datalogic Scanning, Inc. of Eugene, Oreg.

Figure 1:
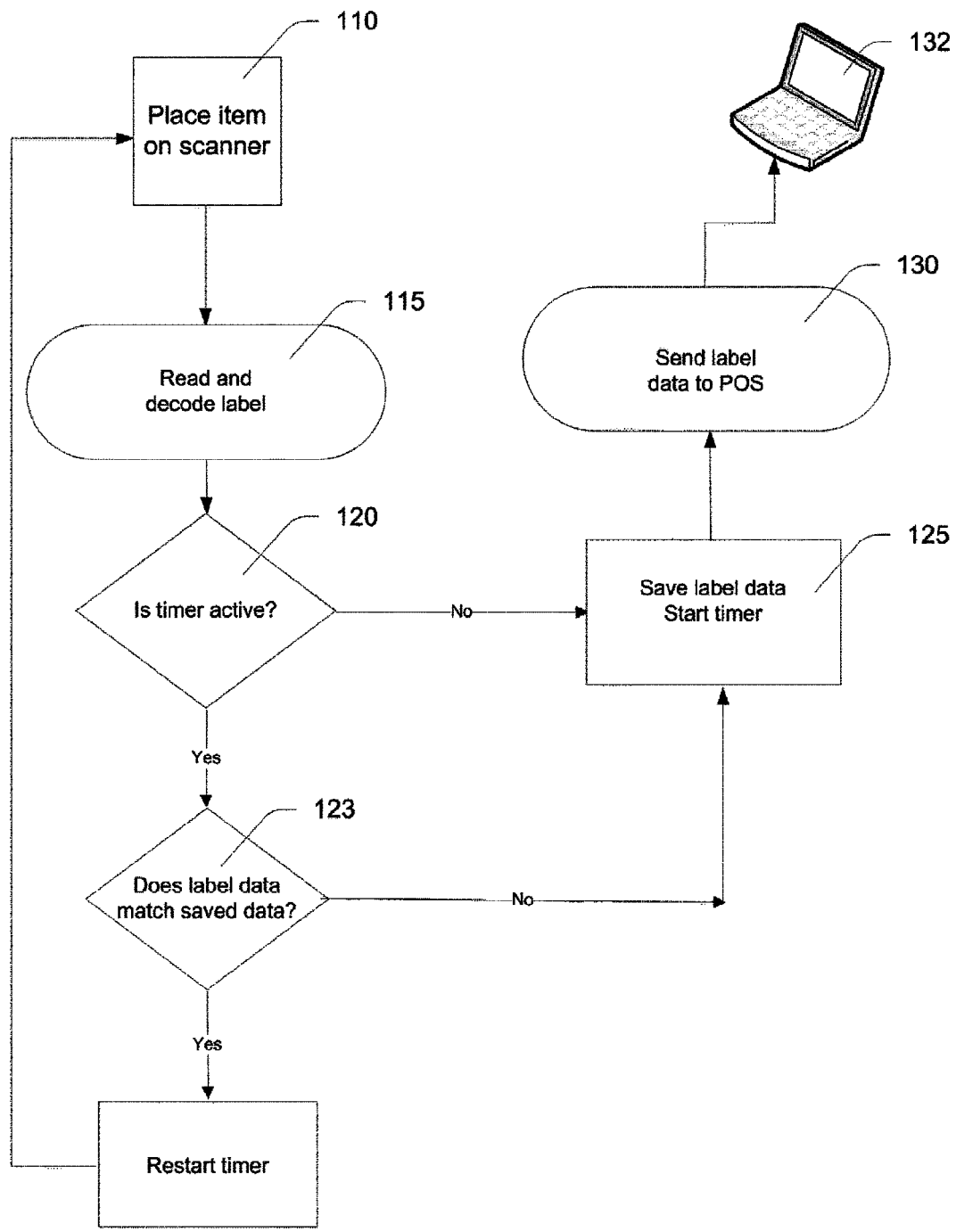
FIG. 1 is a prior art flowchart describing a typical duplicate reporting prevention scheme for individually scanned items.
Figure 2:
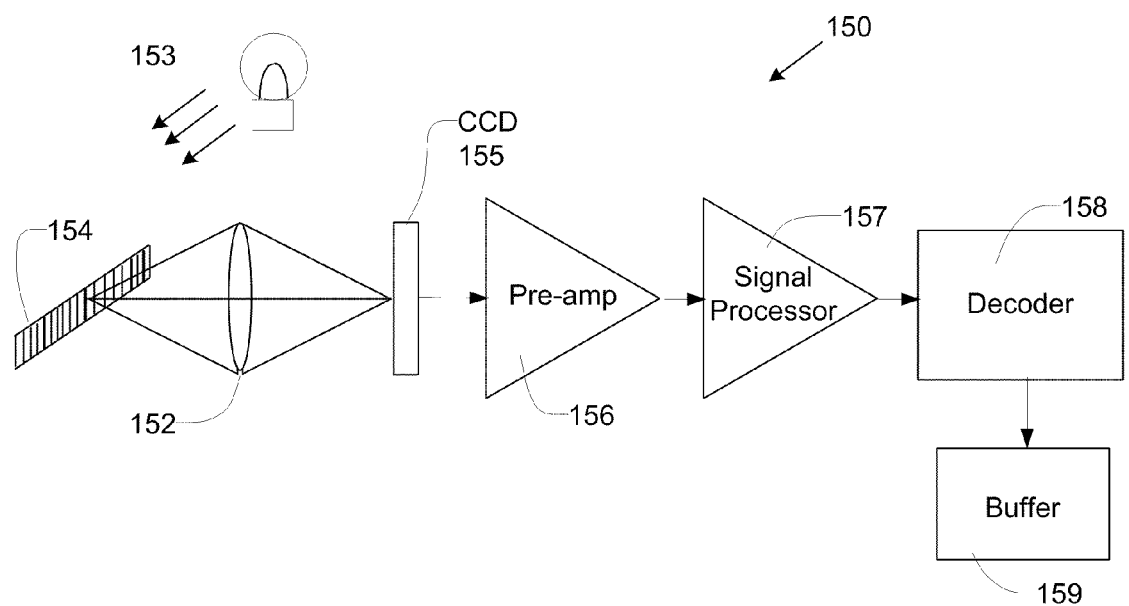
FIG. 2 is a schematic diagram showing the hardware in an optical code scanning system.

FIG. 2 illustrates a scanning system 150 including an optical collector or lens 152 that collects ambient light 153 reflected from a target, such as a bar code label 154, and focuses it onto a sensor 155 such as a charge coupled device (CCD) or a CMOS sensor. Sensor 155 converts light energy into an electrical signal representing bar code label 154, or other symbolic pattern printed on the target. To augment the intensity of light reflected from the target, scanning system 150 may be illuminated by one or more LEDs (light emitting diodes) or other suitable light source. Sensor 155 may send data directly to signal processor 157, or sensor 155 may interact with a pre-amplifier 156 to produce an enhanced data signal that may be conditioned by signal processor 157 for interpretation by a decoder 158, and subsequent storage in a computer memory buffer 159. Prior to storing it in buffer 159, new label data expressed in any symbolic label format, of any length, is converted into a uniform, 16-bit unique identifier. A suitable decoding method entails executing a cyclic redundancy check (CRC), typically used to convert random data sequences into a common format. A standard CRC polynomial is used to generate a uniform, compact data representation to maximize information storage efficiency. Other methods for generating a unique key to represent label data may be used as an alternative to the CRC decoding method.

Figure 3:
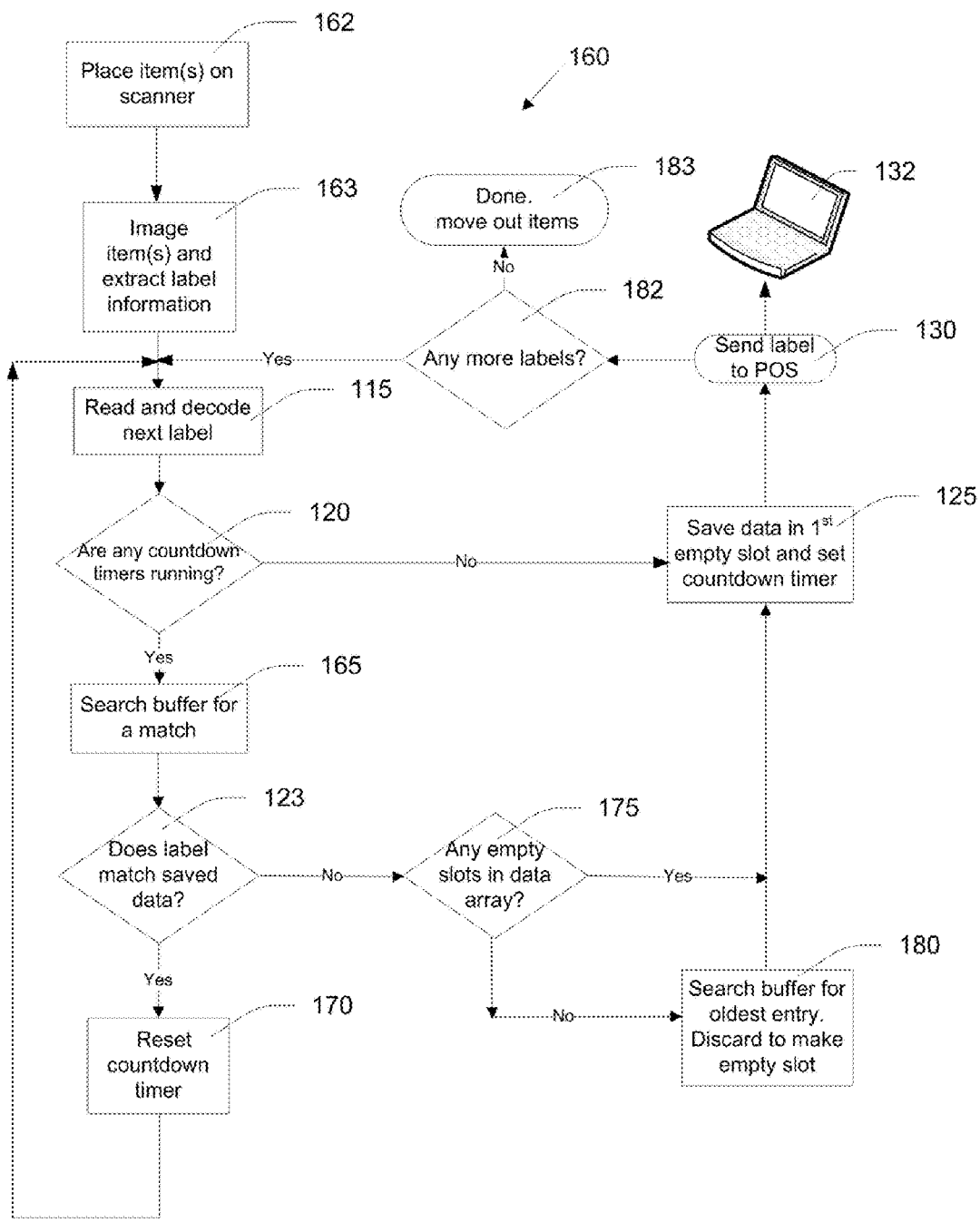
FIG. 3 is a flowchart describing a procedure for preventing duplication errors when rapidly reporting data from a group of scanned items.

FIG. 3 is a flowchart illustrating logic governing a preferred method 160 for processing a group of bar code labels, while managing buffer 159 to prevent multiple reads. The flowchart shows a decision sequence implementing a preferred method executed by software excerpts as shown below. With reference to FIG. 3, in one embodiment, a group of items may be placed within the read zone of an imaging scanner in process block 162, for example, at a check-out station in a retail store. An image of the group is captured in process block 163, from which individual bar codes may be serially extracted, decoded, and processed. In another embodiment, a single item bearing multiple bar codes, some of which may contain unique information, and others of which may contain redundant information, is placed in the read zone and scanned, perhaps with an imaging scanner if the multiple labels are simultaneously visible to the scanner. One or more bar code labels 154 affixed to each item is detected in process block 115, producing decoded label data in a common CRC format. Although a single image may include a group of items, each bar code label 154 is processed serially, in rapid succession.

Because the time elapsed since a previous group of labels were imaged is much greater than the interval between reads within the current group, it is likely that all the timers set for the previous group of items have expired. To save time, a decision block 120 determines whether or not any countdown timers tracking previously read items remain active. If all timers set for previously scanned items are verified as expired, the current group of data is confirmed as being new and not duplicative. Furthermore, upon expiration of a timer, its associated bar code label data is cleared from buffer 159. Therefore, if all timers have expired, buffer 159 is empty of decoded data and the system need not search for an open slot in which to store new data. Process block 125 proceeds to retain the newly-decoded data for each bar code in buffer 159, and activates a timer corresponding to each bar code stored. Process block 130 then reports the data to POS terminal 132.

If, however, decision block 120 finds that any timers set for previously scanned items are still active, process block 165 searches data buffer 159 for a match to the newly-scanned data. If the newly-scanned data matches data stored in buffer 159, according to decision block 123, it is thus determined to be a duplicate and therefore is not reported to POS terminal 132. Since the matching data is already saved in buffer 159, process block 170 simply resets its associated countdown timer.

If the current data is verified by decision block 123 as new (i.e., no match exists in buffer 159), the new data is saved in the first empty slot available in the buffer and a countdown timer is set. If decision block 175 determines that buffer 159 has no empty slots available in which to store data, process block 180 locates the oldest data and sacrifices it to make room. To determine which data is the oldest, a timestamp array is maintained in buffer 159, indicating the age of each set of bar code data residing there. Once a slot has been cleared, process block 125 saves the new data in the new empty slot and starts its timer, and then proceeds to process block 130 reporting the data to POS terminal 132.

As each label in the group is read, the system generates an audible beep. If decision block 182 determines that there are more labels to be processed, the method is repeated for the next label. When the operator recognizes that the number of beeps coincides with the number of labels in the group, indicating that all labels have been successfully read and are done processing, the operator may remove the items from the read zone, as indicated in process block 183.

Figure 4:
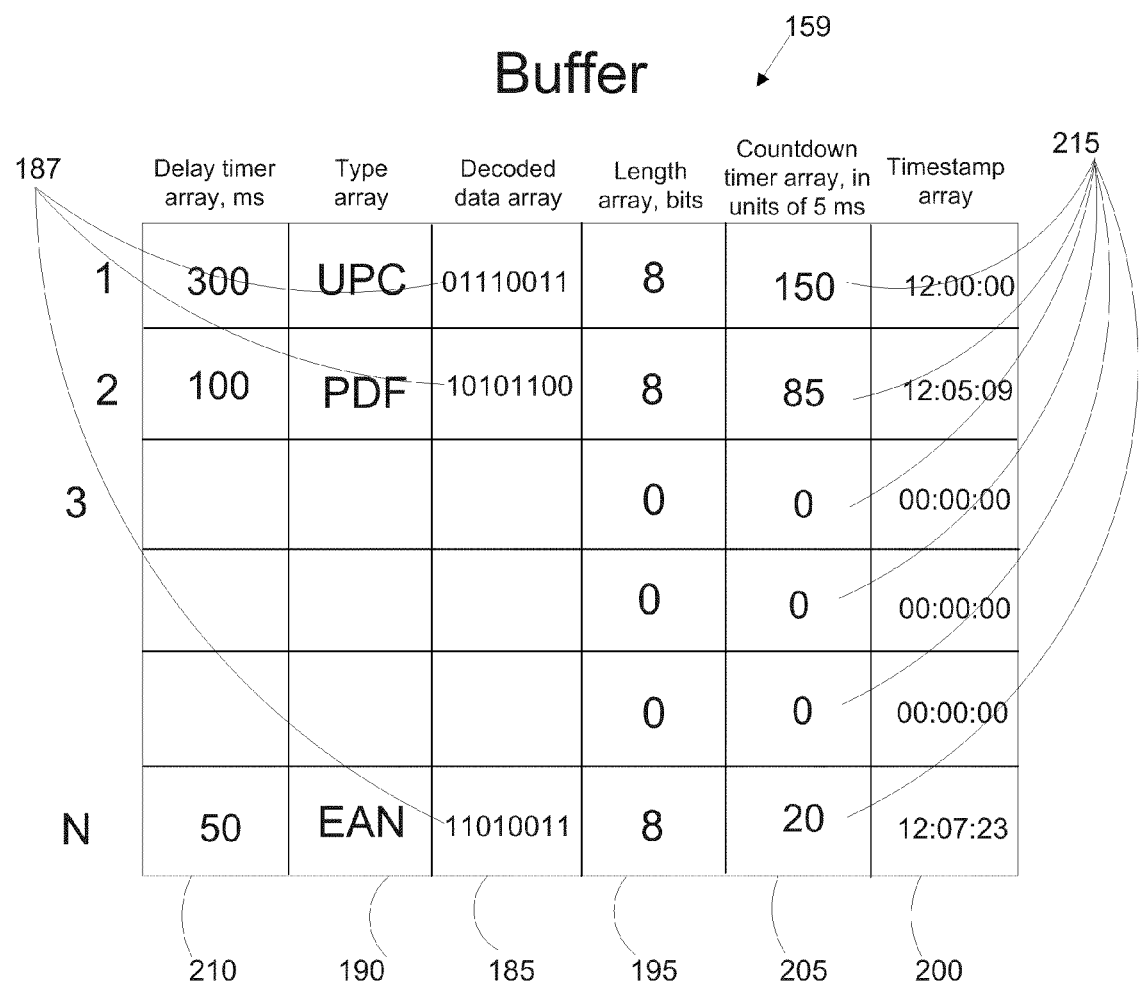
FIG. 4 is a diagram of a buffer comprising a collection of array variables of dimension N, used to track a group of N scanned items.

With reference to FIG. 4, a preferred scheme uses buffer 159 to store, in a collection of array variables, multiple labels 1 through N and their attributes, and to support activation of N multiple delay timers. Before describing the computer program excerpts below that implement the decision sequence just outlined, buffer 159 is examined in detail, using example data shown in FIG. 4. Array variables comprising buffer 159, according to a preferred embodiment, are thus presented as columns comprising the matrix shown. A decoded data array 185 stores a common format CRC representation of each label as read by a scanner, regardless of its type, the number of elements, N, in the array being equal to the number of items a user wishes to retain in the buffer. In a preferred method, data elements 187 of decoded data array 185, each pertaining to a separate item, may contain an entire bar code label, portions of the decoded label, data corresponding to the bar code, or combinations thereof. A type array 190 stores the type of optical code for each label, (e.g., UPC, EAN, etc.), and a length array 195 stores the length of the optical code for each label. A timestamp array 200 records the time data was last stored in decoded data array 185. An array of countdown timers 205 keeps track of time elapsed since an identical item was detected; a delay time array 210 retains the initial maximum value to which the corresponding countdown timer is initialized.

Timer elements 215 of countdown timer array 205, each pertaining to a separate item, take on values that range between zero and a designated delay time, up to several seconds. Different timer elements 215 may be set to different delay times, as determined by the system processor, to ensure the countdown timers do not prematurely expire before a double read can occur. Different delay times are set according to whether each item requires a modified timer delay setting (hereafter referred to as "modified mode" or "2D"), generally in the range of 350 milliseconds to ten seconds, and preferably in the range of one second to five seconds, or a standard timer delay setting (hereafter referred to as "standard mode" or "1D"), generally in the range of 350-650 milliseconds, and preferably in the range of 400-600 milliseconds, because a 2D code takes longer to decode than a 1D code. The corresponding timer element is then set for the appropriate mode and started with the applicable delay. A zero value indicates an inactive timer and therefore an empty data array element as well. Thus, buffer 159 is effectively a queue, supplied with data from a decoding engine source, and from which data, as it ages, is removed by periodically decrementing a countdown timer. The source fills the queue within buffer 159, while the timer logic empties the queue.

In the preferred system there are a plurality of delay timers. The delay time for a particular timer may be set based upon several factors such as (a) label type: a 2D code may take longer to decode than a 1D code, so the 2D code timer would be assigned a longer delay timer; (b) time of day: in a grocery store environment, speed is very important, so during busy times of the day, the delay timers might be set for a longer (or shorter) period, such as a longer period during busy times where operators may tend to try to move items through faster due to pressure to complete transactions; (c) origin of label: for a multi-imager scanner, performance characteristic of the scanning hardware may dictate different preferred time periods depending on the origin of the label; (d) POS characteristic: not all Point of Sale terminals are alike, thus the time period may be selected for the particular POS terminal to which the scanner communicates; (e) individual checker or other statistical information: based on statistics of prior checker performance, it may be determined that a particular checkout clerk tends to experience higher occurrences of double reads, upon the clerk signing in to a given checkout lane/cash register, the scanner may be with a given set of delay timers chosen for that clerks style of operation.

The timer associated with the new label data stored in a slot within the buffer is described above as counting down from a given time value (for example one second) down to zero, restarting back to one second at step 125. Alternately, the timer may start at zero and count upwards to the given time value. In either case the timer is active while counting (up or down) until reaching the elapsed time value without having been restarted.

The number of array elements N in a given system is typically greater than one, the actual number N may be fixed for the system or may be a variable that is programmable, that is, selected by the user, such as by way of programming optical codes, programming commands sent from the host, or other suitable method. Where the value for N is selectable, the user may be able to set N=1, which when operating in that mode would be in operation equivalent to a prior single delay timer system.

With reference to FIG. 3, FIG. 4, and Table 1 below, software routines coded interchangeably in C or C++, that manage the contents of buffer 159 are explored in detail in the following discussion. Table 1 relates buffer arrays 185-210 shown in FIG. 4 to their corresponding array variable names that appear in the software excerpts below.

TABLE 1

Data attributes and their associated variable names used in a preferred software implementation. © 2008 Datalogic Scanning, Inc.

| Description | Software Variable Name |
| --- | --- |
| Buffer | DRT_Label_Queue |
| Timestamp recording when data was saved | DRT_Label_Queue.time |
| Decrementing Timers | DRT_Label_Queue.drt |
| Number of labels retained in buffer (N) | DRT_Q_DEPTH |
| Label lengths (value of zero indicates the slot in the queue is empty) | DRT_Label_Queue.length |
| Label types | DRT_Label_Queue.type |
| Decoded label data | DRT_Label_Queue.crc |
| Designated delay time | DRT_Label_Queue.drt_initial |
| Label just read | data |
| Length of label just read | length |
| Free running time quantum | DRT_Ticks |
| Type of label just read | type |

The first software routine encountered in the process is called "Calculate CRC," which implements process block 115 by decoding newly-scanned data using a CRC lookup table denoted by the function CRCTable [ ]:

```
© 2008 Datalogic Scanning, Inc.
unsigned short Calculate_CRC( unsigned char *address, unsigned count)
{
    unsigned i ;
        unsigned short CRC = 0 ;
    for(i=0 ; i< count; address++, i++)
    {
            CRC = (CRC<<8) ^ CRCTable[(CRC>>8) ^ *address] ;
    }
    return( CRC ) ;
}
```

For each bar code label detected, decision block 120 (FIG. 3) branches based on whether or not any of timer elements 215 of timer array 205 are active. If all timer elements 215 are zero (expired), a comparison of the decoded label data against previous label data contained in decoded data array 185 is unnecessary, and the decoded label data is automatically retained by process block 125, in the first available empty slot in decoded data array 185.

In the example of FIG. 4, the first available empty slot in buffer 159 is slot 3. Thus, element 3 of decoded data array 185 takes on the value of the decoded label data. A routine "Save_Label_In_Queue" implementing the storage function of process block 125, may be specified as follows, in which the label length, type, decoded data, and timestamp are all saved into buffer 159:

```
© 2008, 2009 Datalogic Scanning, Inc.
void Save_Label_In_Queue ( slot_index, label_length ,
label_type , label_data , drt_time)
{
    DRT_Label_Queue[slot_index].length = label_length ;
    DRT_Label_Queue[slot_index].type = label_type ;
    DRT_Label_Queue[slot_index].crc = Calculate_CRC( label_data, label_length) ;
    DRT_Label_Queue[slot_index].time = DRT_Ticks ;
    DRT_Label_Queue[slot_index].drt =
    DRT_Label_Queue[index].drt_initial = drt_time;
        drt_last_label_read_index = slot_index ;
}
```

The corresponding 3rd element of countdown timer array 205 is then initialized to a predetermined maximum value, and the timer begins counting down to zero. A function, "DRT_Decrement," implementing the timer activation part of process block 125 runs, via a timer interrupt service routine, in parallel with the label testing and insertion function to cull spent data from the data store. "DRT_Decrement" is called periodically, the period being matched to the unit of the time delay. For instance, "DRT_Decrement" runs every millisecond if the units of the timers are in milliseconds. When a timer expires, the corresponding element of decoded data array 185 is cleared, or made empty, by setting the length, specified by the variable DRT_Label_Queue[ ].length, to zero in the final step. "DRT_Decrement" may be specified by the following code, in which the countdown timer array is represented by the variable DRT_Label_Queue[ ].drt:

```
© 2008 Datalogic Scanning, Inc.
void DRT_Decrement( )
{
    unsigned i ;
        DRT_Ticks++;
    if( DRT_Q_Busy == FALSE )
    {
        for( i=0; i<DRT_Q_DEPTH; i++)
        {
            if( DRT_Label_Queue[i].drt )
            {
                DRT_Label_Queue[i].drt-- ;
                if( DRT_Label_Queue[i].drt == 0)
                {
                    DRT_Label_Queue[i].length = 0 ;
        }//ENDIF
            }//ENDIF
        }//ENDFOR
    }//ENDIF
}//ENDRTN
```

The decoded label data is then reported to POS terminal 132, via process block 130.

Returning to decision block 120, if any one of timer elements 215 is active (i.e., still decrementing), buffer 159 is searched for a match to current decoded label data, based on comparison of label types, label lengths, and data content. A routine "DRT_Test_Label," implementing process block 165, may be specified by the code below. First, the label type of the decoded label data is analyzed by a series of conditional tests that may result in the assignment of the variable "label_type" to one of the following four categories: UPCA, UPCE, EAN13, or EAN8:

```
© 2008, 2009 Datalogic Scanning, Inc.
bool DRT_Test_Label( label_type,
        char * label_data_location,
        label_total_length,
        label_base_length,
        drt_time )
{
    int i, index, oldest ;
    unsigned short crc ;
    bool crc_done = FALSE ;
    DRT_Q_Busy = TRUE ;
    If( label_type == UPCA_ADDON_2DIGIT
    || label type == UPCA_ADDON_5DIGIT || label_type ==
    UPCA_ADDON_C128)
    {
        label_type = UPCA ;
        label_length = label_base_length ;
    }
    If( label_type == UPCE_ADDON_2DIGIT
    || label_type == UPCE_ADDON_5DIGIT || label_type ==
    UPCE_ADDON_C128)
    {
        label_type = UPCE ;
        label_length = label_base_length ;
    }
    If( label_type == EAN8_ADDON_2DIGIT
    || label_type == EAN8_ADDON_5DIGIT || label_type ==
    EAN8_ADDON_C128)
    {
        label_type = EAN8 ;
        label_length = label_base_length ;
    }
    If( label_type == EAN13_ADDON_2DIGIT
    || label_type == EAN13_ADDON_5DIGIT || label_type ==
    EAN13_ADDON_C128)
    {
        label_type = EAN13 ;
        label_length = label_base_length ;
    }
```

In this routine component, for a label containing a base portion and a two-digit, 5-digit, or Code128 supplemental or "add-on" portion, only the base portion is retained for purposes of comparing with buffered data.

Next, the "type," "length," and "crc'" attributes of the decoded label data are compared with the types, lengths, and decoded values of label data retained in buffer 159, thus implementing decision block 123. First, the type and length of the decoded label data are tested against the types and lengths of the buffered label data, stored in array variables "DRT_Label_Queue[ ].type" 190 and "DRT_Label_Queue[ ].length" 195, respectively. If the type and length values match, label data is decoded into a CRC value, and the result is compared against decoded data values stored in decoded data array 185, represented by the variable "DRT_Label_ Queue.crc." A routine component may be used to execute the searching and matching functions as follows:

```
© 2008 Datalogic Scanning, Inc.
for( i=0; i<DRT_Q_DEPTH; i++)
{
    if(DRT_Label_Queue[i].length)
    {
        if(DRT_Label_Queue[i].length == length && DRT_Label_Queue[i].type == type)
        {
            crc_done = TRUE ;
            crc = Calculate_CRC( data, length) ;
            if( DRT_Label_Queue[i].crc == crc)
            {
                DRT_Label_Queue[i].drt =DRT_Label_Queue[i].drt_initial ;
                    DRT_Label_Queue[i].time =DRT_Ticks ;
                    drt_last_label_read_index = i ;
                DRT_Q_Busy = FALSE ;
                return(FALSE);
            }//ENDIF
        }//ENDIF
    }//ENDIF
}//ENDFOR
```

If a match or a partial match is found during execution of process block 115 or decision block 123, the current decoded label data is deemed to be duplicative. A partial match may occur if label segments are decoded, if an item is slowly removed from the read zone, or if a part of an item remains in the read zone following a label read event. The current decoded label data is then retained by process block 170 in decoded data array 185, and its corresponding timer element 214 is re-initialized to a designated delay time. A routine "DRT_Restart_Last_Label_Read," implementing process block 170, may be specified as follows to restart the double read timer:

```
© 2008 Datalogic Scanning, Inc.
void DRT_Restart_Last_Label_Read( )
{
    if( DRT_Label_Queue[drt_last_label_read_index].drt != 0
        && DRT_Label_Queue[drt_last_label_read_index].length != 0)
    {
        DRT_Label_Queue[drt_last_label_read_index].drt =
            DRT_Label_Queue[drt_last_label_read_index].drt_initial;
    }
}//ENDRTN
```

Because the decoded label data has been determined to be duplicative, it is not reported to POS terminal 132.

If a match is not found by decision block 123, the decoded label data is deemed to be non-duplicative and the process proceeds to decision block 175 to determine if any empty slots are available in the data array. Decision block 175 then branches according to whether or not there exist any empty slots in decoded data array 185. A routine, "DRT_Get_Empty_Index," implements decision block 175 by searching for the first available empty slot in the buffer. An empty slot is easy to recognize because the data length is zero:

```
© 2008 Datalogic Scanning, Inc.
int DRT_Get_Empty_Index( )
{
    unsigned i ;
    int result = -1 ;
    for( i=0; i< DRT_Q_DEPTH; i++)
        if( DRT_Label_Queue[i].length == 0 )
        {
            result = i ;
            break;
        }
    return(result);
}
```

If decision block 175 determines that there are currently no empty slots of zero length in decoded data array 185, process block 180 looks for the oldest entry by inspecting elements of timestamp array 200 in variable "DRT_Label_Queue[ ].time." The oldest entry is then discarded to provide an empty slot in which to store the decoded label data. A routine implementing process block 180 may be specified as follows:

```
© 2008 Datalogic Scanning, Inc.
if( (index=DRT_Get_Empty_Index( )) == -1 )
{
    oldest = 0xFFFFFFFF ;
    for(i=0, index = 0; i<DRT_Q_DEPTH; i++)
    {
        if(DRT_Label_Queue[i].length == 0)
        {
            index = i ;
            break ;
        }
        if((DRT_Label_Queue[i].time < oldest) )
        {
            oldest = DRT_Label_Queue[i].time ;
            index = i ;
        }
    }//ENDFOR
    DRT_Label_Queue[index].length = 0 ;
```

```
}//ENDIF
Save_Label_In_Queue ( index, label_base_length, label_type,
    label_data_location, drt_time);
DRT_Q_Busy = FALSE ;
```

Once a slot is available, the decoded label data may be stored by process block 125 in the first available empty slot in decoded data array 185, and the corresponding element of timer array 205 is activated. The process of saving data to the buffer again entails recording the length of the data, the code type, the CRC decoded value, and a timestamp. Timers are reset to a designated delay time based on label type characteristics. Finally, process block 130 reports the decoded label data to POS 132.

The systems and methods described herein may have several advantages. In an example where a user at a retail checkout station grasps two different items (item A and item B), one in each hand and presents them at about the same time in the read zone of the scanner, in a prior system having only a single delay timer, the system would read item A, then read item B and since item B is a unique, different item, it may re-read item A again potentially double-charging for item A. However in a preferred method as described above with N delay timers, where N>1, the scanner would read item A (setting a delay timer T1 for item A) then read item B (setting a delay timer T2 for item B) and if item A is re-scanned, as long as delay timer T1 is still active (which it should be), it will be determined that item A is a duplicate and thus the customer will not be double-charged for item A.

In other applications, there may be multiple optical codes on the same package of the same or different code symbologies. In an example where a package bearing both a UPC code label (label A) and an Interleaved 2 of 5 label (label B) to a scanner at a retail checkout station, in a prior system having only a single delay timer, the system would read label A, then read label B and since label B is a unique, different label, it may re-read label A again potentially double-charging label A. However in a preferred method as described above with N delay timers, where N>1, the scanner would read label A (setting a delay timer T1 for label A) then read label B (setting a delay timer T2 for label B) and if label A is re-scanned, as long as delay timer T1 is still active (which it should be), it will be determined that this scan of label A is a duplicate and thus not double read label A.

Thus while certain preferred embodiments and applications have been shown and described, it will be apparent to those having skill in the art that many changes may be made to the details of the above-described embodiments without departing from the underlying principles of the invention. The scope of the present invention should, therefore, be determined only by the following claims.

The invention claimed is:

1. A method of reading a series of optical code labels, comprising the steps of:
   scanning an optical code label;
   decoding the optical code label to produce new label data;
   providing a data buffer that retains prior data entries pertaining to a plurality of previously scanned optical code labels, each of the prior data entries having a timer associated therewith set to a predetermined delay time;
   determining whether the new label data is duplicative by determining whether the new label data matches or partially matches any of the data entries pertaining to the plurality of previously scanned optical code labels residing in the data buffer for which there exists an active timer;
   if the new label data is determined to be duplicative, restarting the timer associated with the matching data entry; and
   if the new label data is determined to be non-duplicative, reporting the non-duplicative new label data to a host.

2. A method according to claim 1, further comprising
   if the new label data is determined to be duplicative, discarding the new label data.

3. A method according to claim 1, further comprising
   if the new label data is determined to be non-duplicative, adding the new label data into the data buffer as another prior data entry with an associated timer, and starting the associated timer.

4. A method according to claim 1, wherein the optical code label is a bar code label.

5. A method according to claim 1, wherein the scanning is performed by an electronic or opto-electronic device.

6. A method according to claim 1, wherein the host is a point-of-sale terminal.

7. A method according to claim 1, wherein the predetermined delay time varies among data entries, based on the type of optical code label represented by the label data.

8. A method according to claim 1, wherein the predetermined delay time varies among data entries, based on data embedded in the optical code label.

9. A method according to claim 1, wherein the predetermined delay time is within a range of 350 milliseconds to 10 seconds.

10. A method according to claim 1, wherein data entries in the data buffer are selected from the group consisting of label data, timer data, timestamp, length, optical code type and delay time.

11. A method according to claim 10, wherein the timestamp indicates age of the label data entry, and in which a full data buffer is emptied of old data to accommodate new data.

12. A method according to claim 1 further comprising
    if the new label data is determined to be non-duplicative, determining if there are any empty slots in the data buffer, if no empty slots are available, discarding an oldest data entry to make a new empty slot and adding the new label data into the new empty slot as another prior data entry with an associated timer, and starting the associated timer.

13. A method according to claim 1 wherein the timer comprises a countdown timer that counts down from a given time to zero.

14. A method according to claim 1 wherein the prior data entries comprise (1) a first data entry pertaining to a previously scanned first optical code label and having a first timer associated therewith set to a first predetermined delay time for which the first timer will be active, and (2) a second data entry pertaining to a previously scanned second optical code label and having a second timer associated therewith set to a second predetermined delay time for which the second timer will be active.

15. A method according to claim 1 wherein the timer comprises a counting up timer that counts upward from zero to a given time value.

16. A method of reading optical code labels, comprising the steps of:
    retaining, in a memory, data entries pertaining to a plurality of previously scanned optical code labels, each of the data entries having a timer associated therewith set to a predetermined delay time for which the timer will be active;
    scanning a new optical code label;
    decoding the new optical code label to produce new label data;
    determining whether the new label data is duplicative by determining whether the new label data matches or partially matches any of the data entries pertaining to the plurality of previously scanned optical code labels retained in the memory for which there exists an active timer;
    if the new label data is determined to be duplicative, restarting the timer associated with the matching data entry; and
    if the label data is non-duplicative, reporting the non-duplicative label to a host.

17. A method according to claim 16 further comprising
    if the new label data is determined to be non-duplicative, adding the new label data into the data buffer as another prior data entry with an associated timer, and starting the associated timer.

18. A method according to claim 16 wherein the step of retaining comprises
    retaining, in a memory, a first data entry pertaining to a previously scanned first optical code label, the previously scanned first optical code label having a first timer associated therewith set to a first predetermined delay time for which the first timer will be active, and
    retaining, in the memory, a second data entry pertaining to a previously scanned second optical code label, the previously scanned second optical code label having a second timer associated therewith set to a second predetermined delay time for which the second timer will be active.

19. A method of reading optical codes, comprising the steps of:
    receiving, into a memory, a plurality of data entries pertaining to previously scanned optical codes, comprising at least (1) a first data entry pertaining to a previously scanned first optical code and having a first timer associated therewith set to a first predetermined delay time for which the first timer will be active and (2) a second data entry pertaining to a previously scanned second optical code and having a second timer associated therewith set to a second predetermined delay time for which the second timer will be active;

scanning a new optical code;

decoding the new optical code to produce new optical code data;

determining whether the new optical code data is duplicative by determining whether the new optical code data matches or partially matches any of the data entries pertaining to the previously scanned optical codes retained in the memory for which there exists an active timer;

if the new optical code data is determined to be duplicative, restarting the timer associated with the matching data entry; and if the new optical code data is non-duplicative, reporting the non-duplicative optical code data to a host.

20. A system for reading optical codes, comprising an optical code reader operative for scanning optical codes and acquiring data entries corresponding to the optical codes;

a memory;

a processor operative (1) to receive, into the memory, a plurality of the data entries pertaining to previously scanned optical codes, comprising at least (a) a first data entry pertaining to a previously scanned first optical code and having a first timer associated therewith set to a first predetermined delay time for which the first timer will be active and (b) a second data entry pertaining to a previously scanned second optical code and having a second timer associated therewith set to a second predetermined delay time for which the second timer will be active; (2) to obtain a new optical code from the optical code reader; (3) to decode the new optical code to produce new optical code data; (4) to determine whether the new optical code data is duplicative by determining whether the new optical code data matches or partially matches any of the data entries pertaining to the previously scanned optical codes retained in the memory for which there exists an active timer; (5) if the new optical code data is determined to be duplicative, to restart the timer associated with the matching data entry; and (6) if the new optical code data is non-duplicative, to report the non-duplicative optical code data to a host.

* * * * *